United States Patent
Robertson

(10) Patent No.: US 6,981,651 B2
(45) Date of Patent: Jan. 3, 2006

(54) HEATING SYSTEM

(76) Inventor: Alastair Robertson, La Ville Michel, F-22130 Corseul (FR)

( * ) Notice: Subject to any disclaimer, the term of this patent is extended or adjusted under 35 U.S.C. 154(b) by 128 days.

(21) Appl. No.: 10/491,641

(22) PCT Filed: Oct. 9, 2002

(86) PCT No.: PCT/GB02/04580

§ 371 (c)(1),
(2), (4) Date: Mar. 31, 2004

(87) PCT Pub. No.: WO03/033970

PCT Pub. Date: Apr. 24, 2003

(65) Prior Publication Data

US 2004/0256476 A1    Dec. 23, 2004

(30) Foreign Application Priority Data

Oct. 13, 2001  (GB) .................................... 0124669

(51) Int. Cl.
*F24D 3/08*    (2006.01)
(52) U.S. Cl. ......................... 237/19; 237/2 A; 237/16
(58) Field of Classification Search ................ 237/2 A, 237/2 B, 16, 19; 165/18
See application file for complete search history.

(56) References Cited

U.S. PATENT DOCUMENTS

| | | | | |
|---|---|---|---|---|
| 5,060,601 A | * | 10/1991 | Vidalenq | 122/406.1 |
| 5,538,072 A | * | 7/1996 | Burkhart et al. | 165/232 |
| 6,109,339 A | * | 8/2000 | Talbert et al. | 165/48.1 |
| 6,305,612 B1 | * | 10/2001 | Besik | 237/78 R |
| 6,435,420 B1 | * | 8/2002 | Kasai et al. | 237/12.1 |

* cited by examiner

*Primary Examiner*—Derek S. Boles
(74) *Attorney, Agent, or Firm*—Barnes & Thornburg LLP

(57) ABSTRACT

A heating system for a building comprises a boiler and radiators to which hot water is supplied from the boiler, in which at least some of the return water flow from the radiators, typically at 6° C., circulates through a first heat exchanger to cool the exhausting products of combustion, means is provided to direct a small part of the return water flow through at least one heat exchanger which gives up heat to the building and/or to the boiler heating the water for heating he building, to cool the diverted water to well below the dew point, and means is provided to supply the cooled water to a second heat exchanger through which the already cooled exhaust products of combustion have to pass after leaving the first heat exchanger, to achieve full condensation of the water vapour content of the products of combustion form the boiler.

11 Claims, 5 Drawing Sheets

HEATING SYSTEM

FIELD OF INVENTION

Figure 1:
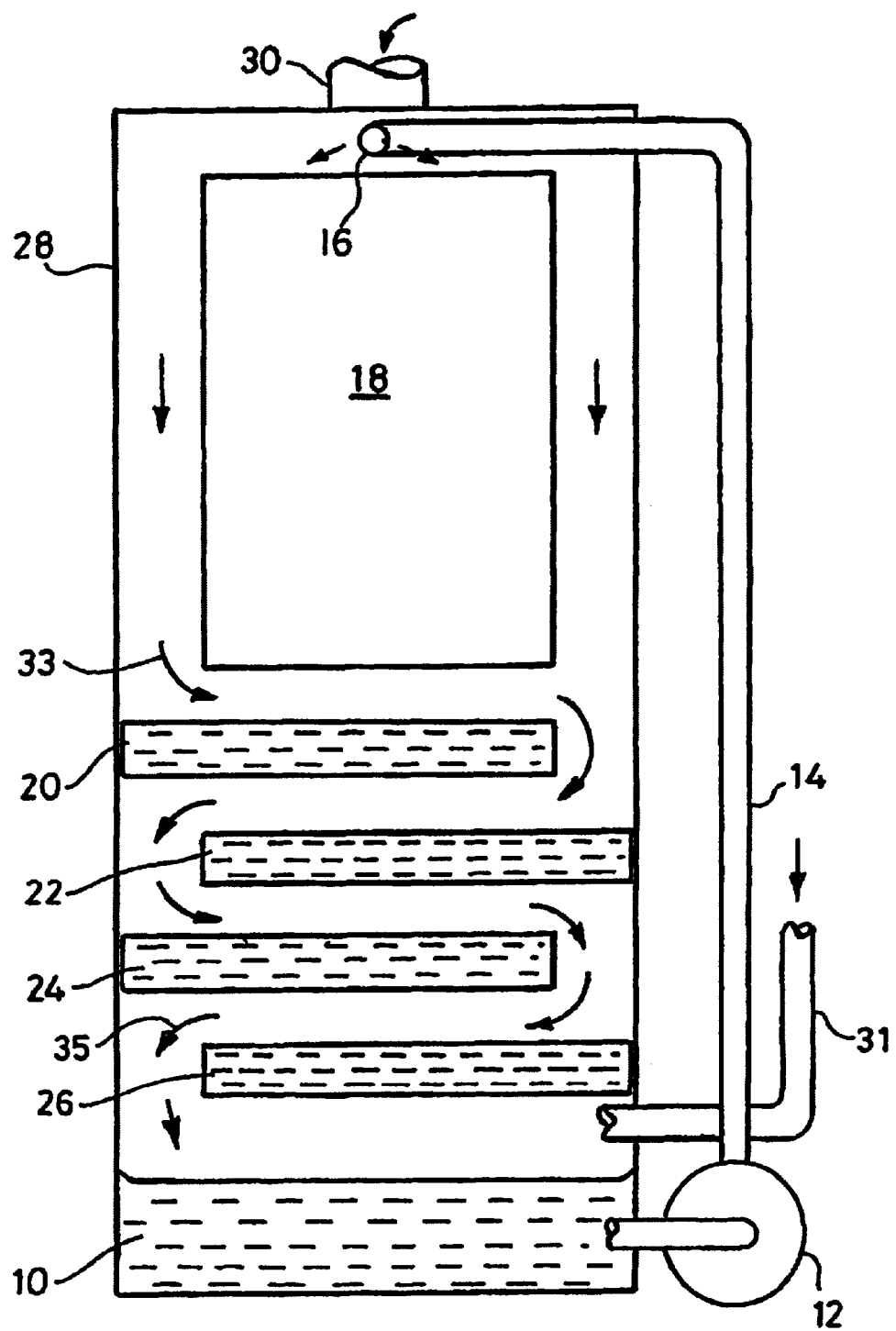

This invention concerns condensing boiler based heating systems.

BACKGROUND TO THE INVENTION

A condensing boiler system will cause the steam of combustion of a fuel to condense to liquid water and will also collect the latent heat of vaporisation of the steam and recycle this heat into the boiler system and thus increase the thermal efficiency of the boiler system.

Thus it has previously been proposed to recover heat from the flue gases of a water boiler in earlier UK Patent Application No. 0107963.1, using a secondary heat exchanger, which raised the gross efficiency of a boiler from about 89.5% to about 92.5%.

The following points have been noted in relation to water boilers:

1. The flue gas temperature from a boiler without a condensing secondary exchanger is well above 100° C., typically in the range 150°–250° C., and it is quite certain that such a boiler recovers no latent heat from steam because the flue gas temperature is too high for any condensation to take place. If then, such a boiler operates with a gross efficiency of nearly 90%, then it is possible to conclude that all the steam latent heat is still trapped in the flue gases effluent from the boiler, and will escape up the flue.
2. The same boiler, fitted with a stainless steel (or other suitable metal) secondary heat exchanger as previously proposed, will demonstrably operate with a gross efficiency of about 93%, an efficiency gain of just 3%. This secondary exchanger, although fitted with a water condensate overflow tube, has been found to provide only a liter or so of water over an operating time of several hours. Therefore the secondary exchanger (condenser) described, although condensing some water and therefore correctly termed a condensing heat exchanger, is only condensing a small proportion of the steam, and a proper description would be a partially condensing heat exchanger because in no way is the volume of water collected representative of the volume of steam generated by the burning fuel, but is only a fraction thereof.
3. As confirmation of (2) above, large quantities of steam can be seen issuing to atmosphere from the secondary exchanger previously proposed, and this shows that at any rate some steam escapes the secondary exchanger and latent heat escapes with the steam.
4. In a typical example of a kerosene based fuel, the percentage of hydrogen in the fuel by weight is about 13.74%. Thus it can be shown that burning 1 US gallon per hour of the fuel will produce 3.6 kilograms of water as steam per hour. Moreover, the specific latent heat of steam at 100° C. is 2.26 megajoules per kilogram, or almost 6% of the total calorific value of the fuel, and so far only a fraction of this has been recovered by secondary heat exchangers as proposed. For total latent heat recovery to take place, it follows that about 3.6 kilograms of water could (and should) be recovered. In practice perhaps as little as 10% is actually recovered.

Therefore although a 3% efficiency gain has been achieved, the principal amount of energy recovered by the previously proposed secondary heat exchanger is due to reducing the temperature of boiler exhaust gases. The bulk of the steam and its energy escapes to atmosphere, as evidenced by the small volume of condensed water collected 5. The dew point of the water vapour component in the flue gas of a typical domestic boiler is about 50°–55° C. It is quite impossible to fully condense this water and to capture the energy of condensation unless the medium used to cool the gases is below, and ideally considerably below, the dew point. The temperature of the return water from the radiators previously proposed to cool the flue gases is at about 60° C., and therefore is unavailable to cool the flue gases below the dew point.
6. It is not considered sensible to reduce the water flow through the radiators so that the return temperature is sufficiently low (e.g. 25°–30° C.) as to allow this water to be employed in the heat exchanger to effect full condensation of the water vapour in the still hot gases.

OBJECT OF THE INVENTION

It is an object of the present invention to provide an improved condensing boiler based heating system, capable of recovering a greater percentage of the latent heat in the steam present in the flue gases, and an improved condensing heat exchanger for such a boiler.

In the case of combustion of north sea gas, the latent heat in the steam content of the exhaust gases can account for approximately 10% of total combustion energy.

In the case of liquified gases such as butane and propane, the latent heat in the steam content of the exhaust gases can account for about 8% of total combustion energy.

In the case of lighter fuel oils, such as Kerosene and Gas Oil, the latent heat in the steam content of the exhaust gases can account for about 6% of total combustion energy.

These figures are based on typical content of hydrogen of the fuels. The latent heat can be taken to be proportional to the hydrogen content of the original fuel since the latent heat in the exhaust gases will be equal to the heat required to vaporise the water which results when the hydrogen component is burnt in air.

SUMMARY OF THE INVENTION

The invention lies in a method of cooling hot flue gases from a water boiler in which the hot flue gases leaving the boiler are cooled by relatively cold water at below the dew point of the water vapour content in the flue gases, so as inter alia to give up the latent heat from water vapour contained in the flue gases, by reducing the temperature of the gases below the dew point of the water content, and in so doing heating the cold water to a higher temperature, recovering the heat from the heated water to assist in heating the interior of a building heated by hot water from the boiler and in turn cooling the water again, to enable it to be re-circulated to cool the flue gases and to continue to recover latent heat from water vapour present therein.

The condensing heat exchange step may be achieved by circulating the cold water whose temperature is below the water vapour dew point, through a heat exchange device over or through which the flue gases are forced to pass.

Alternatively and preferably the flue gases may be in direct contact with the cold water in the condensing heat exchange step, so that the condensed water combines with the cold water and is carried away in the general flow of water.

Where the condensed water vapour is absorbed into the circulating cold water, the volume of circulating cold water will increase with time. In a closed system, provision must be made to draw off any excess water if the volume of circulating water is to remain substantially constant. Typically this is achieved using a syphon or weir at a suitable point in the cold water circuit.

There are several ways of achieving the desired results with the gas/water cooling system, which include the use of a large heat exchanger (due to the need to present a large area of water to the hot flue gases, to effect cooling of the latter) but preferably two separate heat exchangers are employed successively to cool the flue gases.

Preferably a water pump is employed to facilitate water circulation through the two heat exchangers and where the water circulating through the two heat exchangers is separate two pumps may be employed.

In any heat exchange system, the area over which heat exchange is to occur is critical and the heat exchange surface in general will be proportional in area to the heat output from the boiler. In practice, depending on boiler capacity, heat exchanger areas are usually determined by experiment. This is especially the case when considering the area of water to be presented to hot flue gases for direct contact therewith. The heat exchange efficiency has been found to depend inter alia on water and gas flow rates, the angle of gas flow direction to the water surface, and also to the temperature difference between the gases and the water.

According to a preferred feature of the method proposed by the invention for recovering latent heat from water vapour in the flue gases from a hydrocarbon fuel-burning boiler adapted to heat the interior of a building by heating water to be circulated through radiators in the building, hot flue gases from the boiler are cooled first by a heat exchanger through which water returning from the radiators is caused to flow and then by a second heat exchanger through which water at a temperature below the dew point of the water vapour in the flue gases is caused to flow.

Preferably water from the second heat exchanger containing heat recovered from the flue gases by the second heat exchanger, is conveyed to the boiler and/or to the building interior.

Preferably the water flowing through the second heat exchanger is separate from the water flowing through the main boiler and radiators.

The temperature of the relatively cold water in the second heat exchanger is typically in the range 20°–40° C. preferably 25°–30° C.

Preferably the water which is to flow through the second heat exchanger is cooled by circulating it through an air to water heat exchanger through which air which is to support the combustion in the burner of the boiler passes on its route to the combustion chamber. In winter time this air temperature typically can be in the range 0°–10° C. in the UK.

The second heat exchanger causes heat to be transferred to the relatively cold water therein due to the cooling of the flue gases as well as by extracting latent heat from the water vapour content as the temperature of the water vapour in the exhaust gases is reduced to below its dew point.

Thus in recovering latent heat (which would otherwise be lost) all the exhaust gases are cooled to well below 100° C.

The products of combustion from a boiler are frequently at temperatures in excess of 175° C., and therefore by cooling all the products of combustion, heat will be recovered from the gaseous components of the exhaust gases in the form of ordinary heat. This can vary from about 3% for a modern high efficiency boiler (where the exhaust gases may have already been partially cooled) to as much as 8% or 10% for older less efficient boilers, (from which the exhaust gas temperature will typically be higher), and therefore will contain more heat energy to be given up as these higher temperature gases are cooled to below the dew point of the water vapour present in the exhaust. Therefore applying a closed loop water/hot gas (CLW/HG) exhaust gas cooling system to an older inefficient. boiler, will provide an even greater efficiency gain than when applied to a more efficient modern boiler.

It will be appreciated that the gain in efficiency is obtained by considering a building and a heating system as a whole, as distinct from the normal thinking which considers the boiler only when considering efficiency.

If the water used to condense the water content of the exhaust by the second heat exchanger is to be re-circulated in a closed loop system, the water heated by the flue gases and the recovery of latent heat in the second exchanger must itself be cooled before it can be reused therein, and the increase in overall efficiency is achieved by transferring the energy so recovered either to the main boiler (to decrease the energy needed to heat the water flowing therethrough) and/or via a heat exchanger such as a radiator, to assist in heating the interior of the building being heated by the boiler. This can be directly or via a third water to water heat exchanger It should be noted that fuel oils, coal etc., can contain sulphur and on burning, the sulphur combines with oxygen to produce sulphur dioxide which will combine with water to produce sulphurous acid, which is a corrosive substance. Present in the atmosphere in aerosol form, after emission from millions of domestic central heating boilers and thousands of power stations, sulphurous acid returns to earth as so-called acid rain which is believed to cause damage to forests, lakes and possibly causes or aggravates asthma and other allergic conditions in human beings, if not also other animal species.

In fact North Sea and LPG gases do not in the first instance contain significant sulphur content. The sulphur compounds are in fact added by manufacturers as "smellers" so that the presence of these gases can be detected by smell when leaks occur, and it is these sulphur compounds in the case of such gases which produce sulphur dioxide on burning.

If significant condensation of the water vapour content of the flue gases is achieved, sulphur dioxide (SO2) present in the flue gases will be absorbed by the condensed water and, water being heavier than air, will collect at a low level and draining away this water automatically drains away the sulphurous acid.

If (as is proposed in preferred embodiments of the invention) there is direct contact between cooling water and the flue Sulphur Dioxide ($SO_2$) therein will also be absorbed onto the cooling water, and will therefore not be found in the exiting flue gases.

Where there is direct contact between cooling water and the flue gases, water condensing from the latter will mix with the cooling water and thereby become separated from the flue gases.

The invention also lies in the combination of a water boiler fuelled by burning a hydrocarbon fuel such as gas or oil and a building in which the boiler and radiators supplied with hot water from the boiler are all located, wherein heat which would normally be lost in the exhaust gases leaving the boiler is recovered by a heat exchanger to which water at below the dew point of water vapour in the exhaust gases is supplied to cool the gases and recover the latent heat of vaporisation from the water vapour, and wherein the recovered heat is employed to heat water to be heated by the boiler and/or to heat a heat exchanger located within the building and/or to heat air entering the burner of the boiler, so that in terms of energy input to the building and energy lost from the building, the overall efficiency of the combination can be considered to be almost 100%.

In essence the boiler and building and flue can be considered as a closed loop for recovering heat which would otherwise be lost in the flue gases. Such an installation can capture virtually all of the latent heat in the steam content of the exhaust gases, and by reducing the temperature of the gases, will also extract additional heat from the gaseous content, thereby increasing the overall efficiency of the installation.

As a rule, not all rooms in a building are kept at the same temperature in winter. Thus in a domestic dwelling, bedrooms, hallways and stairs for instance are often kept somewhat cooler than living rooms. There are therefore several locations in an ordinary domestic dwelling where heat will be dissipated from a radiator or other heat exchanger quite effectively even if the temperature of the water supplied to it is equal to or less than the return flow temperature from the main radiator system in the house. It is therefore quite feasible to locate a suitable radiator or heat exchanger in a building such as a domestic dwelling for the purposes of the invention.

Thus according to the invention, a small amount of the water returning to the boiler from the radiator system of a building, possibly ½–1 liter/minute, is diverted through an additional radiator or other heat exchange device in the building being heated, such that the exit water temperature therefrom will be below the dew point temperature, and the exiting water is supplied to a secondary heat exchanger to which the exhaust gases from the boiler are also supplied to enable full condensing of water vapour in the flue gases from a boiler supplying hot water to the radiators to be achieved.

Typically the exit water temperature is in the range 30°–40° C.

Preferably the secondary heat exchanger includes a first water/gas exchanger through which water returning from the radiators is circulated to cool the exhaust gases and in which the water is kept separate from the exhaust gases, and by a second water/gas exchanger in which the gases and water may be in direct contact and in which the water temperature is lower than that in the first heat exchanger.

Also according to the invention the water diverted through the additional radiator or heat exchanger subsequently may be forced to flow through an air-cooled heat exchanger at the air inlet to the burner of the boiler before it is circulated through the said second heat exchanger, so as to cool the water to a temperature in the range 25°–30° C. by exposing it to cold incoming air, and in consequence heating the incoming air and thus increasing the burner efficiency.

The invention therefore also lies in a boiler (typically a fossil-fuel burning boiler) in which an air intake to the burner includes a water/air heat exchanger for heating the incoming air and in turn cooling water circulating in the heat exchanger, to assist in condensing the water content of the products of combustion of the boiler, before they exit to atmosphere.

A system embodying the invention thus allows the transfer of heat energy to the circulating water and/or to the air supply to the burner so as to benefit the whole building heated by a boiler and hot water radiator system by the full condensation of the flue gas water content from the boiler exhaust gas, collecting as it does the latent energy from that water content of the flue gases and recycling this energy back to the building and/or to the boiler, therefore reducing fuel consumption and/or increasing available energy for heating the building.

Where a building contains a reservoir of cold water in the roof space for supplying cold water to the building, the invention also envisages the provision of a water to water heat exchanger in that reservoir and means for circulating thereto some of the return flow water from the radiator system within the building either directly from the radiators or after passing through the said additional radiator or after passing through the air-cooled heat exchanger in the air inlet to the burner of the boiler, so as to cool water to be used to cool the flue gases while simultaneously warming the water stored in the high level reservoir, reducing energy needed to heat that water and also reducing the possibility of the reservoir of water freezing in winter.

Preferably such an arrangement includes a thermostatically controlled valve for restricting the flow of water to the said water to water heat exchanger if the temperature of the water in the storage reservoir exceeds a preset temperature.

In essence the invention provides a heating system for a building comprising a boiler and radiators to which hot water is supplied from the boiler, in which at least some of the return water flow from the radiators typically at 60° C., circulates through a first heat exchanger to cool the exhausting products of combustion, means is provided to direct a small part of the return water flow through at least one heat exchanger which gives up heat to the building and/or the boiler heating the water for heating the building, to cool the diverted water to well below the dew point, and means is provided to supply the cooled water to a second heat exchanger through which the already cooled exhaust products of combustion pass after leaving the first heat exchanger, to achieve full condensation of the water vapour content of the products of combustion from the boiler.

Furthermore the invention also provides a system which not only recovers the latent energy in the water content of the exhaust gases but recycles this recovered energy back to the boiler thus reducing the boiler fuel consumption.

The advantages of the invention may be seen by considering a domestic dwelling in the UK, in winter, when full boiler heat output will be required. The house loses heat in a number of ways, notably through walls, roof, windows etc., but there are other causes of effective heat loss which are not normally taken into account.

One such is the effect of the temperature of the air drawn in to enable combustion to occur in the boiler. In winter this temperature is considered to be 0°–5° C. in the UK. Most domestic boiler flue systems are of the so-called balanced flue type. Essentially cold air from outdoors is drawn straight into the boiler burner system and it has been calculated that in the case of an 80,000 BTHu boiler, the mass of this cold air drawn in per hour is about 34 kg. The hourly aspiration of this mass of air at 0°–5° C. affects the boiler heat output since it represents a cooling effect in the combustion chamber and it has been calculated that in such a boiler, the heat output is reduced by approximately 0.5–0.75%.

Another loss of heat is what is wasted in the flue gases from the boiler heating the house. Thus a conventional non-condensing boiler exhausts flue gases at a temperature which varies according to design but is most likely in the range 200°–250° C. These gases not only contain a quantity of what was once called "sensible heat", (because it is possible to measure it directly) due to the high temperature of the gases, but also contains an appreciable quantity of latent energy stored in water vapour mixed with the other flue gases, due to the combustion of about 13.75% hydrogen in a typical fuel oil.

Another significant heat loss is directly due to the fact that a typical household consumes about 250 liters daily of water. In winter, this water is supplied to the house at a temperature of about 6°–8° C., and this cold water has to be warmed or even boiled for many household uses. The energy required to do this in winter will therefore be higher than in summer when the cold water (especially if stored in the house before use) can be in the range 15°–20° C. Frequently the cold water is stored in a tank in a loft or attic, and unless carefully insulated such tanks can freeze in winter. The invention envisages a system which can help to avoid this problem.

It has been calculated that if a closed loop water/hot gas (CLW/HG) system is incorporated into a heating installation powered by a boiler operating at say 15 kw it will enhance the overall efficiency of the installation by typically from 9% to 15%. Put another way, the boiler fuel consumption will fall by a similar amount (i.e. typically from 9% to 15%), thus reducing $CO_2$ emissions by the same amount.

It can also be shown that if a CLW/HG system is coupled to a larger installation such as a hydrocarbon fuelled boiler in a power station, again significant improvement in overall efficiency can be obtained if the recovered heat energy is returned to the boiler for example to heat incoming air to the burner so as to increase its heat output or reduce the fuel needed to attain a particular burner temperature.

If a closed loop water/hot gas heating system proposed by the invention were to be adopted worldwide, $CO_2$ emissions would be reduced by up to 9–15% annually, and where direct water/gas contact is provided for $SO_2$ is also extracted therefrom, and one of the causes of acid rain would be removed.

According to a preferred feature of the present invention, an advantage of a CLW/HG system embodying the invention and involving gas/water contact is that both the efficiency and emissions of an existing boiler can be improved without the expense of fitting a new boiler, merely by fitting a closed loop water/hot gas exchanger to condense the steam content of the exhaust gases from the existing boiler, and recovering and utilising the heat so gained therefrom.

The invention therefore also lies in a secondary heat exchanger adapted to be fitted to the exhaust flue of an existing boiler and to be connected to the water returning from the radiators heated by the boiler for cooling the exhaust gases in the flue, and to be connected to a further heat exchange means for cooling a second flow of water therethrough to a temperature substantially below the dew point of the water content of the gases in the flue.

A CLW/HG unit embodying the present invention can be constructed in any convenient manner and according to a preferred feature of the invention such a unit is adapted to be accommodated into an existing boiler installation, in particular so as to fit inside the casing of such a boiler.

Figure 2:
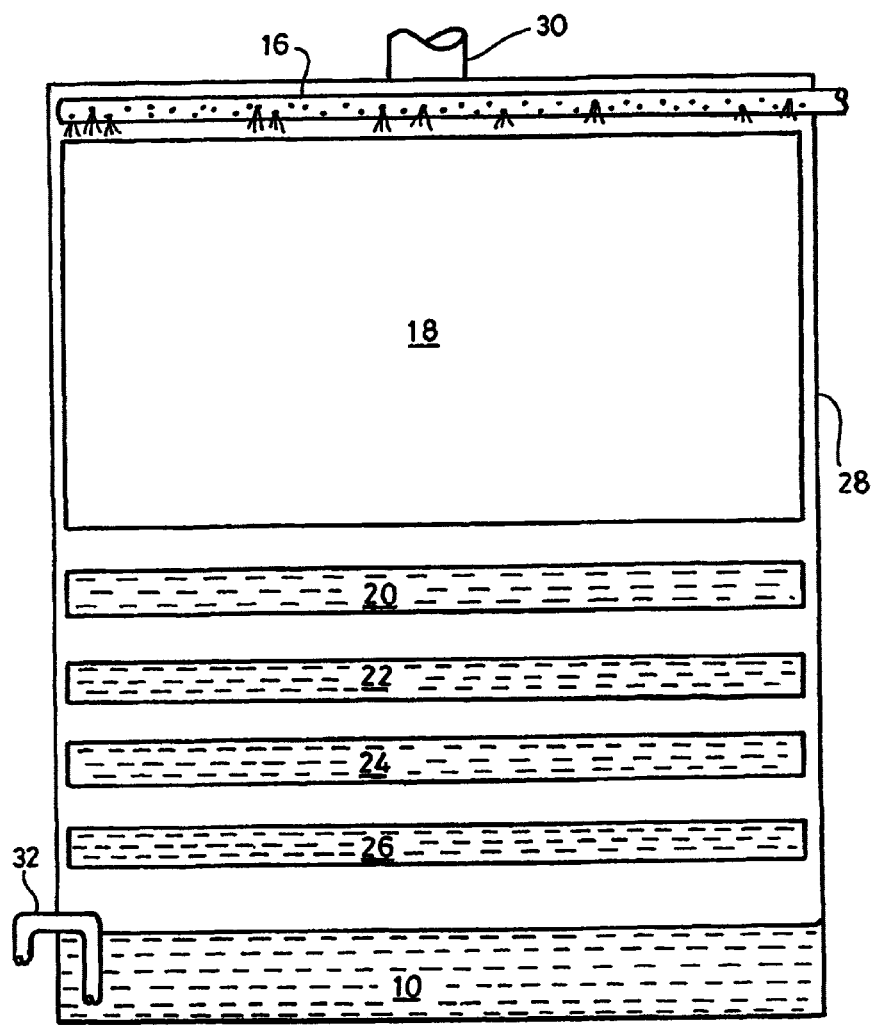
Figure 3:
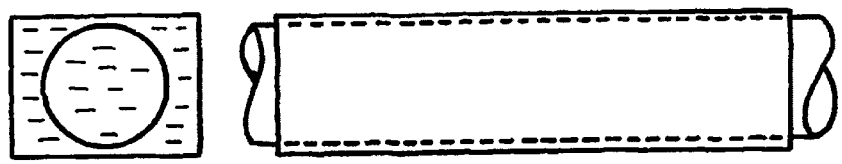
Figure 4:
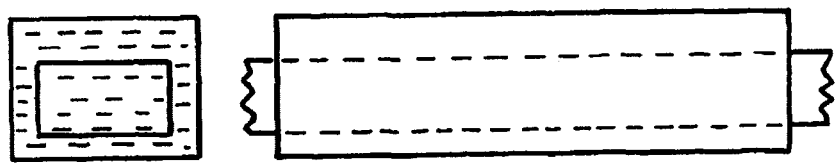
Figure 5:
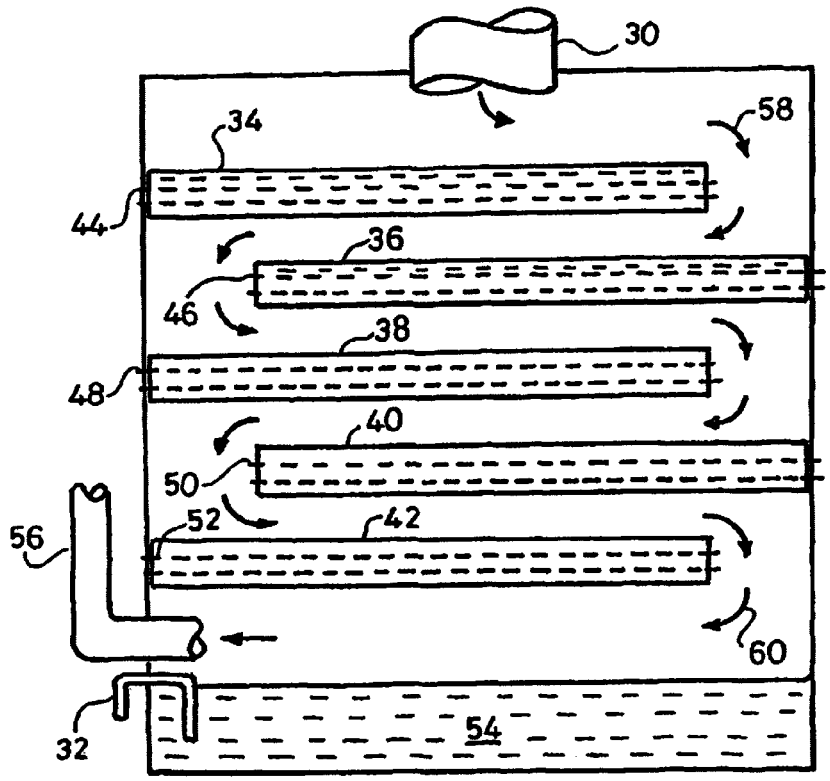
Figure 6I:
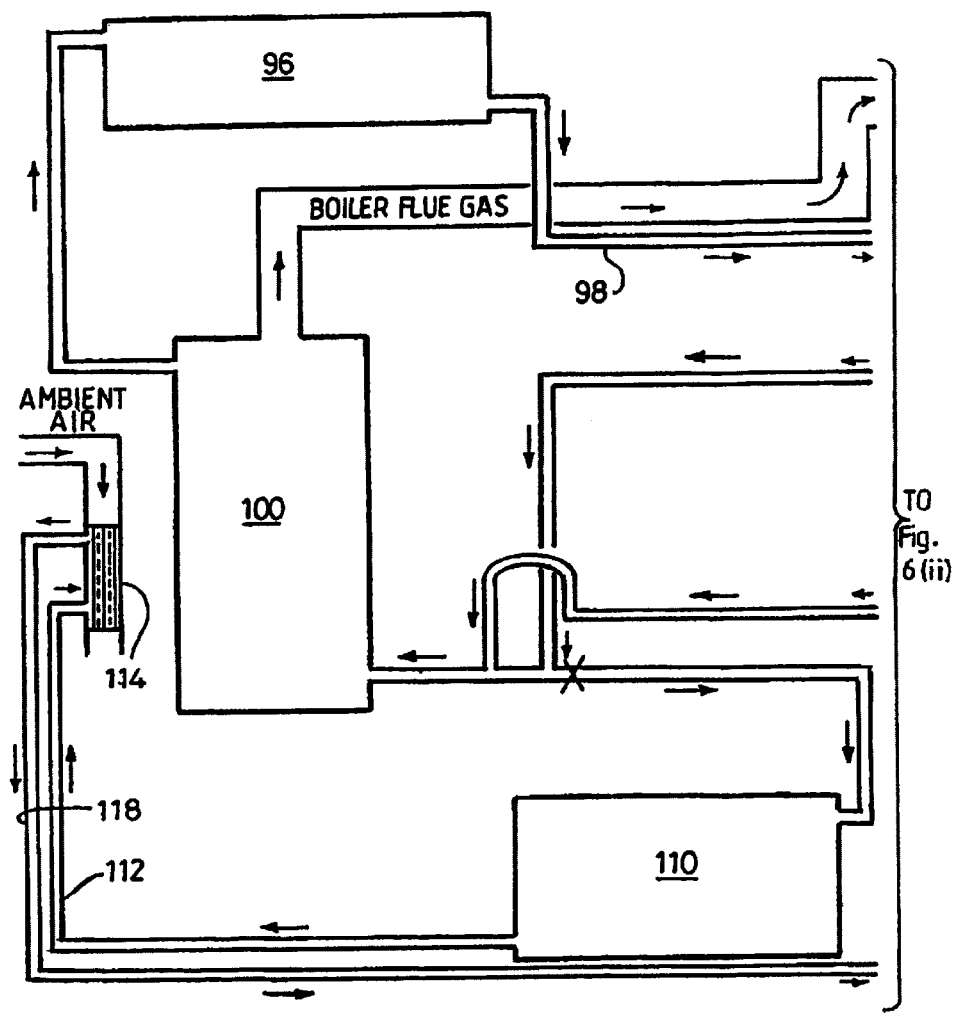
Figure 6:
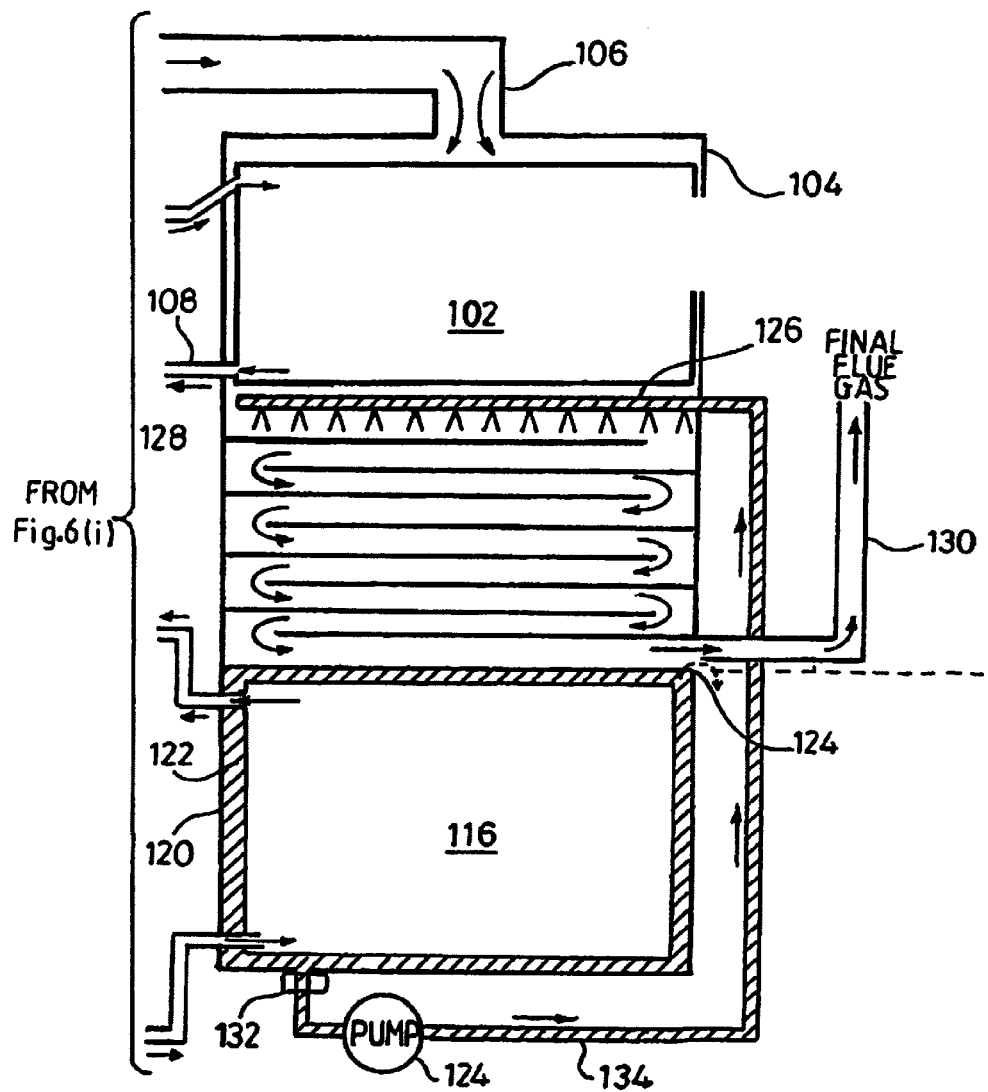

The invention will now be described by way of example with reference to the accompanying drawings in which:

FIGS. 1 and 2 are end and side elevation diagrammatic views of an improved secondary heat exchanger for use with a water heating boiler, which allows for direct water/flue gas contact;

FIGS. 3 and 4 illustrate alternative arrangements for cooling water heated by direct contact with flue gases, FIG. 5 is a side elevation diagrammatic view of another embodiment, providing improved direct flue gas/water contact and cooling heated water in a heat exchanger, and FIG. 6 is a schematic diagram of a total system using an oil fired condensing boiler which also removes sulphur dioxide from the flue gases.

CALCULATIONS OF SPECIFIC LATENT HEAT OF STEAM

According to published data, the specific latent heat of steam at 100° C.=2.26×10 kilojoules per kilogram or, more suitable for our calculations=2.26 megajoules per kilogram, (Mj/Kg)

Now in the case of a boiler consuming fuel at the rate of 1 US gallon/hour, this equates to 3.64 liters of fuel/hour.

The weight of fuel consumed per hour is obtained by multiplying the volume by the density of the fuel. The density of one typical fuel is 0.7945. Therefore the weight of such a fuel burnt (per hour)=2.892 kilograms per hour.

If the gross fuel calorific value=46.08 Mj/Kg, then the total calorific value per hour is 2.892×46.08=133.2 Mj per hour.

If, as is typical, the percentage of hydrogen in the fuel=13.75%, then the weight of hydrogen in 2.892 Kg of fuel=2.892×0.1374=0.4 Kg, i.e. 0.4 Kg of hydrogen is oxidised each hour.

Hydrogen reacts with 8 times its weight of oxygen to produce water. Thus the weight of water produced per hour is 0.4×9=3.6 Kg of water per hour, albeit produced in the form of steam.

If the latent heat of steam=2.26 Mj/Kg, the latent heat of 3.6 Kg of steam is 3.6×2.26= 8.136 Mj. This is the heat per hour contained in the steam in the flue gases of such a boiler burning this "typical" fuel.

If the total energy of the burnt fuel is 133.2 Mj per hour, then the percentage of the latent heat in the steam to the total energy is 8.136/133.2=6% of the total energy from the fuel.

This figure should be seen in relation to the commonly held belief that the latent heat of steam in the boiler flue gases is approximately 3% of the total calorific value of the fuel burnt.

Also the total weight of steam per hour is 3.6 Kg, which is equivalent approximately to 3.6 liters of water per hour, which by coincidence is similar to the volume of the fossil fuel consumed. This is about 60 cc/minute.

Modifications to the Secondary Heat Exchanger Proposed by UK Patent Application No. 0107963.1

As has been described so far the previously proposed secondary heat exchanger extracts only a small percentage of the latent heat from condensing steam and the purpose of the present invention is to substantially increase the extraction rate of this latent heat. Reference is hereby made to the drawings and related description in UK Patent Application No. 0107963.1 for details of the design and functionality of the previously proposed secondary heat exchanger.

In the embodiment shown in FIGS. 1 and 2, direct flue gas cooling is achieved if condensate water is pumped from a reservoir 10 via a pump 12 and pipe 14 to a perforated pipe 16 located above, centred and parallel to the upper face of a core 18, through which water at 60° C. or less flows as it returns from a heating system to the main boiler heat exchanger. The design of core 18 may be such as is described for the secondary heat exchanger in UK 0107963.1. Water from 16 will flow down the external surfaces of the core as a film or sheet of water eventually to fall into and entirely fill by overflowing a shallow tray 20 which may comprise the reservoir 10, but is more preferably the top one of a plurality of similar trays 22, 24, 26 each of which overflows to feed the one below and the lowest of which feeds the reservoir 10. The core 18, perforated pipe 16, trays 20 to 26 and reservoir 10 are located within or formed by a housing 28.

In parallel the flue gases from the main boiler are fed into the housing 28 via pipe 80 to mix with the water escaping from 16 and to travel therewith as it passes over the core 18 and via trays 20 to 26 to the reservoir 10.

As the film of water cascades down the outside of the core, the hot gases will be cooled by contact therewith, and will continue to be cooled as they traverse the surface of the water in the trays 20 et seq. In cooling, steam in the flue gases will be cooled below the steam/water transition temperature and in doing so its latent heat will transfer into the water in the trays, and the condensing steam will also be absorbed into the water. Thus simultaneously the water temperature and volume will increase. The water flows into the reservoir 10 from which it will be drawn by the pump 12 and recirculated via the perforated pipe 16 to be cooled as it again makes contact with the surface of the core 18 which is internally maintained at 60° C. by the return flow to the main boiler. As the process proceeds, the increase in volume of the circulating condensate can be drawn off by overflow pipe 32, and this excess water could amount to several liters per hour depending on boiler heat output.

The path of the hot gases from inlet 30 to the final flue outlet 31 (see FIG. 1) is denoted by arrows such as 33, 35.

If significant condensation is to be achieved the temperature of the cascading water needs to be below the dew point of the water vapour in the flue gases. Typically this temperature should be below 40° C., preferably below 30° C.

Second Embodiment

In the arrangement shown in FIGS. 3–5 the core is replaced by five water filled trays 34, 26, 38, 40, 42, each tray being individually cooled by one or more heat exchange tubes 44, 46, 48, 50, 52, arranged to extend across each of the trays, and typically will be immersed by the water in each tray when the system is operating. This design is more compact than that of FIGS. 1, 2 and has a larger flue gas cooling area contained within any given size of housing 28. Water overflowing from 52 is collected in the well 54 at the bottom of the housing.

Hot gas entering the top of the housing from the pipe 30 encounters the water surface of the first tray 34. This water is cooled as before by the water returning to the main boiler. As the hot gases pass over and under the trays, the gases are cooled first by contact with the water surface and then with the underside of the tray.

It is possible that insufficient cooling of the gases will occur by tray 34 to condense steam present in the gases into tray 34. In that event a small pump (not shown) can be provided to circulate condensate from the well 54 to tray 34, from which it will overflow and, by cascade, all the trays will be constantly replenished.

The cooling tubes 44 et seq. of FIG. 5 may be of circular or square or rectangular cross section. Thus FIG. 3 shows a circular section pipe and FIG. 4 a rectangular cross section pipe. By careful selection of height and width dimensions of the latter, an optimum pipe surface area can be achieved for any given size of tray, given that the larger the proportion of the tray cross section occupied by a pipe the smaller will be the volume available for water in the tray.

An overflow pipe 32 is shown in FIG. 5 showing how if water in the well 54 exceeds the height of the overflow pipe, water will leave 54 and can be recovered for re-use elsewhere or simply drained to waste.

In a complete system, the "excess" water can be simply run to waste, or be stored for use as low temperature hot water in a domestic, office or factory environment, or allowed to cool naturally to external ambient temperature for use as "cold" water, perhaps for irrigation or return to water reserves underground for subsequent recovery and use.

The passage of the hot gases from inlet pipe 30 to the final flue outlet 56 is denoted by a series of arrows such as 58, 60.

As with the FIGS. 1, 2 embodiment, the temperature of the cascading water should be below the dew point of the water in the flue gases, and in practice should be below 40° C., and preferably below 30° C. to achieve a high level of condensation of the steam content of the flue gases.

Comparison of Cooling Capabilities

The total cooling surface of the original core 18 is typically 3500 square centimeters.

Considering now the alternative arrangement of FIG. 5. If there are 5 trays in the FIG. 5 embodiment, each 11 cms wide and 52 cms long, then the total surface area of the trays is 2860 sq. cms.

The exhaust gases also traverse the water in the well. If the width of the casing is greater than the width of the trays by 1 cm, the water surface area in the well is 12×52=624 sq. cms.

Therefore the total gas/water interface is (2860+624) =3484 sq. cms.

The gas/metal interface is made up of the total surface area of the walls of the trays. If each tray is 11 cms wide by 3 cms high, the wall area per tray exposed to the passing exhaust gases is (3+3+11)×52=884 sq. cms.

If there are 5 trays the total metal surface area will be 5×884=4420 sq. cms.

The total surface available for cooling the gases is given by adding the areas of the gas/water and gas/metal interfaces.

Therefore the total surface area for cooling is 3484+4420=7904 sq. cms.

The water in the trays is of course itself cooled by the return flow to the boiler through the pipes, and if a small gap exists below each pipe (such as 44) the total external surface of each pipe will be in contact with water. If the rectangular cross-section pipes have a cross-section of 7×2 cms, the surface area of the 5 pipes (each 52 cms long) will be 5×(7+7+2+2)×52=4680 sq cms.

The area of 7904 sq. cms available in a FIG. 5 arrangement compares very favourably with the 3500 sq. cms of exhaust gas cooling surface available in the original core 18 of FIGS. 1 and 2. Furthermore this larger area can be packed into a height of less than 30 cms, typically 28 cms.

As with the earlier embodiments, the temperature of the water passing through the heat exchange tubes (or pipes) should be below the dew point of the water vapour content of the flue gases, typically below 40° C. and preferably below 30° C.

Conventionally hot water leaving the boiler for the radiators is at 72° C. and typically the flow rate through the radiators is adjusted so that the return water temperature is of the order of 60° C. It is possible to arrange matters so that this return water is at a lower temperature such as 30° C. or lower, so as to achieve useful condensation of the steam/water vapour in the flue gases. This will of course raise the temperature of the water before is passes to the boiler to be reheated, which is to advantage since it is normally considered desirable for the return water not to be too low in temperature.

Comparison with Other Fuels

The foregoing has assumed the fuel to be kerosene or the like. However similar advantages are obtained if the fuel is a gas such as natural gas, Propane or Butane. These gases all contain hydrogen as follows:

Natural gas 23.18% by weight
Propane 17.98% by weight
Butane 17.21% by weight.

The recoverable latent heat from these fuels will be directly proportional to the percentage of hydrogen present in the fuels.

Turning now to FIG. 6, the system shown will now be described in detail.

1. Commencing with the boiler 100, hot water at about 72° C. is pumped around a number of heating devices, such as conventional radiators 96. In the case of an ordinary heating system this hot water is returned directly to the boiler for re-heating and continuous recycling. As indicated above, the usual return temperature of the water is about 60° C. The fall in temperature of 12° C. relates to the heat given out by the radiators into the building. In the arrangement shown in FIG. 6 the 60° C. return water is directed via pipe 98 to the upper core 102 of a secondary heat exchanger 104, in accordance with the invention.

2. At the same time flue gases from the boiler, typically at a temperature in the range 150°–250° C., are led into the top of the secondary heat exchanger via duct 106 and are free to flow downward, over and around the external surface of the upper core 102. As this takes place the flue gases give up energy to the core 102. The gas temperature falls to a temperature in the range 75°–95° C., and the water flowing through core 102 rises in temperature, typically by a few degrees centigrade. This water, now typically at a temperature of 62° C. instead of 60° C., is returned to the main boiler 100 via pipe 108. It should be noted that this apparently small temperature rise should be seen in relation to the 12° C. temperature drop across the radiators mentioned above. This would give a probable boiler efficiency of about 92% if no other steps were taken to improve efficiency. In general there will be no condensation of water vapour in the flue gases at temperatures of 75° C. or higher, since dew point is most probably around 60° C.

3. Some of the 62° C. return water directed along the pipe 108 to return to the boiler 100 (typically about ½ liter per minute) is directed into a household radiator 110. To achieve maximum overall efficiency this radiator must be contained inside the building which is heated by the other radiators 96 for reasons which will be explained later. The radiator 110 should be of such a size and be positioned in the building so that water flowing therethrough at a rate of approximately ½ liter of water per minute, and at a temperature of 62° C. on entry, will drop to a lower temperature as it traverses and leaves the radiator. Typically an exit temperature of 35°–40° C. is achieved but an even lower temperature would be better still.

On leaving the radiator 110 the water, still flowing at about ½ liter per minute and at a temperature of say 35° C., is directed via pipe 112 to a further heat exchanger 114 (typically a socalled honeycomb heat exchanger) located in the air intake to the burner of the boiler 100. The heat exchanger 114 is therefore subjected to an inflow of air, the temperature of which in the winter will typically lie in the range 0–10° C., typically 5° C., and on very cold days may even be lower that 0° C.

The aim of heat exchanger 114 is to cool the water leaving the radiator 110 to as low a temperature as possible, while still keeping this water part of the constant volume of water contained within the closed system made up of the boiler 100 and the radiators 96.

In the case of space heating systems, boilers such as 100 will normally only be operated in winter, and in the UK the external winter average ambient temperature is 5° C. (about 41° F.). It is at such times that the system should operate at the highest overall efficiency in terms of fuel/energy conversion and with the least $CO_2/SO_2$ loss to atmosphere. Of course, if the ambient temperature is much lower than 5° C., the probability is that total efficiency of the system will be even higher. If the ambient temperature is higher, the amount of energy needed to heat the building will be less and therefore the quantity of fuel burnt will be less and the quantities of $CO^2$ and $SO^2$ will be proportionately less.

The need to obtain cold water is to enable water vapour in the flue gases to be condensed so as to recover the latent heat energy in that "low temperature steam".

It can be shown that, in the case of a boiler operating at a rated output of 80,000 BTHus per hour, the mass of air demanded by the burner is about 34 kilograms per hour. When this mass of air per hour is passed through the heat exchanger 114 at 5° C., water at 35° C. is found to be cooled typically to 15–20° C., and the air entering the burner will itself be heated to a temperature typically in the range 20–30° C.

This cool water from 114 is now directed to the lower heat exchanger core 116 via pipe 118.

The lower part of 104 comprises a reservoir 120 for water 122 which surrounds and just covers the central core 116. The level is governed by a weir 124. Alternatively or in addition a syphon may be employed to maintain the level.

The water 122 is cooled by the water in 116 to a temperature which will normally be below the dew point of water contained in the flue gases entering 104 via 106.

Water 122 from around 116 is drawn out by a pump 124 and delivered to a manifold 126 containing jet orifices providing a cascade of water for mixing with descending flue gases. A tortuous path may be presented to the water and gases by a plurality of horizontally spaced apart baffles 128.

After passing down and around core 102, the flue gases will now be at a temperature in the range 75° C.–95° C. and these gases are mixed with the water cascading from the manifold 126 and if provided around the baffles in 128. The gases are thereby cooled before exiting to the flue 130 and the area and number of the baffles 128 and volume of water flow from the manifold 126 are selected so as to achieve the desired temperature drop in the gases, prior to exit, so that the exit temperature is typically in the range 40° C.

In a domestic situation, the total area of the baffles is typically in the range of 1–2 square metres, and since the water will cool both faces of the baffles the total cooling area will be twice that, i.e. typically 2–4 square metres. Moreover, since the cooling of the gases is by direct contact with the cooled water, it is not difficult to ensure that the gas temperature falls to below the dew point of water vapour in the gas stream, so causing condensation and loss of heat from the vapour and simultaneous cooling of the hot gases.

In general the baffles 128 should be packed as tightly as possible in the space available so as to present a tortuous path for the exhaust gases and the water. In general the more baffles the better.

In the case of an 80,000 BTHu boiler, the expectation is that about 2 liters per hour of water will condense out from the flue gases, and a flue gas temperature of 30° C.–40° C. should be achieved.

Calculations show that the energy recovered from the condensation of water vapour to produce 2 liters of water per hour, is 4.5 mega joules which is equivalent to 1.3 kilowatts/hour. This energy will raise the temperature of the water 122 circulating around core 116 unless it is cooled, and it is for this reason that it is necessary to remove each hour slightly more than 1.3 kilowatts/hour from the ½ liter/minute water flow. This energy of approximately 1.3 kilowatts/hour is equivalent to about 4% of the energy provided by the radiators 96, where the water flow, and the flow and return temperatures are as specified above. Therefore if radiator 110 (which dissipates this heat in order to cool the return water to 35–40° C.) is located within the building which also contains the radiators, its heat output can be added to that from the radiators 96, so as to produce a theoretical efficiency of the order of 96% for the system taken as a whole.

In addition however the transfer of heat to the incoming air to the boiler can increase the energy available from the boiler. For an 80,000 BTHu boiler, this increase can be just over ½ kilowatt per hour. This means that less fuel is needed to generate the rated heat output from the boiler, and a slightly increased overall efficiency obtained. Typically the further increase in efficiency can be of the order of ½%.

Total system energy efficiency can therefore be of the order of 96.5%.

The only loss is the overflow of water from 124.

Sulphur dioxide can be removed as follows:

From published information, sulphur dioxide is very soluble in water. At NTP, a given volume of water will absorb 39 times that volume of sulphur dioxide. Thus if 30 liters of water per minute is cascading down the baffle plates at 128 this volume of water will readily absorb far more sulphur dioxide than could possibly be present in the volume of exhaust gases passing through and present in the baffle containing region of the heat exchanger housing 104 in the same period of time.

As the water vapour condenses it will increase the volume of the water 122 in the reservoir 120. This rising volume is controlled by weir 124. Water draining over the weir carries with it absorbed sulphur dioxide which can be neutralised by using the alkaline materials such as are used in domestic laundry facilities. Since the circulating water 122 will also become acidic, it is of course necessary to remove this acidity by a neutralising cartridge 132 which may be in the form of a replaceable or rechargeable unit. The pipework 134, pump 124, manifold 126, baffles 128, core 116 and interior of the housing of the heat exchanger 104 must be formed from or coated with a material not chemically affected by sulphurous acid.

Whether spaced apart baffles 128 are employed, or the exchanger relies on mixing the gases with fine water sprays, one thing is common to all variations, namely that the hot exhaust gases are cooled by direct contact with cold water, and the recovered sensible and latent heat of condensation thereby recovered from the flue gases, is incorporated into the heat supplied to the building and/or to the boiler heating radiators within the building so as to increase the overall efficiency of the installation.

What is claimed is:

1. A heating system for a building comprising a boiler and radiators for heating different regions of the building which are supplied with hot water from the boiler and in which the boiler and radiators are all in the building, wherein the boiler includes a burner for burning a hydrocarbon fuel such as gas or oil in a combustion chamber, and a heat recovery system is provided by which heat which would normally be lost in the hot exhaust gases leaving the combustion chamber is recovered therefrom, wherein the heat recovery system comprises heat exchange means through which water returning from the radiators is caused to flow, and through which water at a temperature below the dew point of the water vapour in the flue gases is also caused to flow to cool the hot gases to recover the latent heat of vaporisation from the water vapour therein, and wherein the heat exchange means includes primary and secondary water circuits, water in the secondary circuit being in direct contact with the hot flue gases so that the condensed water and any water soluble products of combustion can mix with the cooling water and will leave the heat exchange means with the cooling water, characterised by means for diverting a proportion of the water returning to the boiler from the radiators from an exit in the return path to a further heat exchange means located within a region of the building which is maintained at a lower temperature than other regions of the building thereby to cool the diverted water to a temperature below the dew point, means for conveying the cooled diverted water via the primary water circuit in the heat exchange means to re-enter the return water path to the boiler, downstream of the exit point from which it was diverted, to return to the boiler for reheating, and a pump is provided for pumping water in the secondary water circuit from a region in which it is cooled by the cooled diverted water flowing through the primary circuit to an upper region to form a cascade in which the hot gases are mixed therewith.

2. A heating system as claimed in claim 1 wherein the further heat exchange means includes a radiator in the lower temperature region of the building.

3. A heating system as claimed in claim 1 wherein the further heat exchange means includes a water to water heat exchanger in a reservoir of cold water provided for supplying cold water to the building.

4. A heating system as claimed in claim 3 which includes a thermostatically controlled valve adapted to restrict the flow of water to the said water to water heat exchanger if the temperature of the water in the storage reservoir exceeds a preset temperature.

5. A heating system as claimed in claim 1 wherein the heat exchange means includes an air to water heat exchanger located in an air intake to the burner of the boiler through which air to support combustion passes on route to the combustion chamber.

6. A heating system as claimed in claim 1 wherein the heat recovery system heat exchange means comprises first and second heat exchange means through one of which water returning from the radiators is caused to flow, and through the other of which water at a temperature below the dew point of the water vapour in the flue gases is caused to flow.

7. A system as claimed in claim 1 wherein the volume of diverted water is in the range of 0.5–1.0 liters/minute.

8. A method of cooling the products of combustion (flue gases) of a fossil (i.e. hydrocarbon based) fuel burning water heating apparatus (a boiler) which in use heats water for circulation by a pump around a closed circuit containing radiators and a main heat exchanger by which it is heated by the burning of the fossil fuel in air in a burner in the boiler, and wherein the flue gases pass through secondary heat exchange means by which they are cooled below the dew point temperature of water vapour in the flue gases so that the water condenses and is thereby separated from the flue gases, and wherein a portion of the circulating water is diverted from the main flow at a point just prior to its return to the main heat exchanger, and the diverted flow is cooled by further heat exchange means to a temperature substantially below the dew point temperature, and wherein the cooled water is employed in the condensing heat exchange step in the secondary heat exchange means to cool the gases below the said dew point and is thereafter returned to the main return water flow to the main heat exchanger downstream of the point at which the portion of the circulating water was diverted.

9. A method as claimed in claim 8 wherein the said condensing cooling step involves a mixing of the flue gases and the cooled circulating water, and the condensing of the water vapour by the said further cooling step increases the volume of water circulating around the generally closed circuit and an overflow or syphon is provided to maintain the volume of circulating water substantially constant, the water and flue gases are separated using gravity before the flue gases exit to atmosphere, and the recovered water drains into a low level reservoir forming part of the said generally closed circuit and a coiled pipe in the reservoir provides a path for the low temperature water by which the heat is exchanged between the water in the reservoir and the low temperature water, to cool the water in the reservoir to below the dew point.

10. A method as claimed in claim 8 wherein the flue gases are progressively cooled in the secondary heat exchange means by a said first cooling step to a temperature above the dew point, and thereafter by the condensing cooling step in which they are cooled to below the dew point by low temperature water which is circulated around a generally closed circuit and which is cooled to substantially below the dew point temperature.

11. A method as claimed in claim 10 wherein the said condensing cooling step involves a mixing of the flue gases and the cooled circulating water, and the condensing of the water vapour by the said further cooling step increases the volume of water circulating around the generally closed circuit and an overflow or syphon is provided to maintain the volume of circulating water substantially constant, the water and flue gases are separated using gravity before the flue gases exit to atmosphere, and the recovered water drains into a low level reservoir forming part of the said generally closed circuit and a coiled pipe in the reservoir provides a path for the low temperature water by which the heat is exchanged between the water in the reservoir and the low temperature water, to cool the water in the reservoir to below the dew point.

* * * * *

UNITED STATES PATENT AND TRADEMARK OFFICE
CERTIFICATE OF CORRECTION

PATENT NO. : 6,981,651 B2
APPLICATION NO. : 10/491641
DATED : January 3, 2006
INVENTOR(S) : Alastair Robertson It is certified that error appears in the above-identified patent and that said Letters Patent is hereby corrected as shown below:

<u>Title page,</u>
Item [57], in the Abstract, line 4, "6° C" should read --60°C--.

Signed and Sealed this

Fourth Day of July, 2006

JON W. DUDAS
*Director of the United States Patent and Trademark Office*